(12) United States Patent
Abderrazzaq et al.

(10) Patent No.: US 8,272,031 B2
(45) Date of Patent: Sep. 18, 2012

(54) POLICY-BASED VIRTUALIZATION METHOD INVOLVING ADAPTIVE ENFORCEMENT

(75) Inventors: Saad Abderrazzaq, Arlington, MA (US); Mahalingam Mani, Cupertino, CA (US); Tanjore K. Srinivas, Howell, NJ (US)

(73) Assignee: Avaya Inc., Basking Ridge, NJ (US)

( * ) Notice: Subject to any disclaimer, the term of this patent is extended or adjusted under 35 U.S.C. 154(b) by 302 days.

(21) Appl. No.: 12/565,063

(22) Filed: Sep. 23, 2009

(65) Prior Publication Data

US 2011/0072504 A1    Mar. 24, 2011

(51) Int. Cl.
*H04L 9/00*    (2006.01)
*H04L 9/32*    (2006.01)

(52) U.S. Cl. .................... 726/1; 726/2; 726/3

(58) Field of Classification Search .................. 726/1–4, 726/6–7, 11, 26–27, 30; 713/150–153; 709/217, 709/225, 229
See application file for complete search history.

(56) References Cited

U.S. PATENT DOCUMENTS

| | | | |
|---|---|---|---|
| 6,578,076 B1 * | 6/2003 | Putzolu | 709/223 |
| 7,774,824 B2 * | 8/2010 | Ross | 726/2 |
| 2009/0049518 A1 * | 2/2009 | Roman et al. | 726/1 |

* cited by examiner

*Primary Examiner* — Hosuk Song

(57) ABSTRACT

A method is provided in which a permission for running a system software instance alongside another system software instance is issued on the basis of a first policy rule concerning the operation of a first software application and a second policy rule concerning the execution of second software application.

20 Claims, 10 Drawing Sheets

POLICY-BASED VIRTUALIZATION METHOD INVOLVING ADAPTIVE ENFORCEMENT

FIELD OF THE INVENTION

The present invention relates to telecommunications in general, and, more particularly, to telecommunications network security in virtualized environments.

BACKGROUND OF THE INVENTION

Telecommunications network security consists of policies adopted by network administrators to protect the network and the network-accessible resources from unauthorized access. A policy is a combination of rules and services, where the rules define the criteria for access and usage of resources. A "telecommunications network policy rule" is a direction that governs the operation of one or more security devices (implemented in hardware and/or software) in a telecommunications network, such as firewalls, anti-virus software, and others. Exemplary rules include: "do not store executable files on a hard drive", "block all network traffic to and from port 23", "do not place application A in the same security perimeter with application B", "do not forward executable files to application A," etc. Such policy rules are specified by network administrators, and implemented by firewalls, anti-virus programs, and other similar services.

FIG. 1 depicts an example of a telecommunications system as is known in the prior art. Secure Network 110 is an enterprise network. Network 110 is separated from the Internet (i.e. network 130) by firewall 120.

Firewall 120 is software and hardware that is designed to block unauthorized access while permitting authorized communications. It is a device configured to permit, deny, encrypt, and decrypt traffic from network 130 to network 110. Firewall 120 fulfills its function by examining the traffic between network 130 and network 110 and blocking traffic that violates one or more policy rules. In this example, firewall 120 is configured to prevent telnet traffic between secure network 110 and network 130.

FIG. 2 depicts the internal organization of secure network 110. Secure network 110 comprises a low-security perimeter and high-security perimeter. The two perimeters are separated by firewall 220. Nodes 210-1, 210-2, and 210-3 are located in the high security perimeter. Nodes 230-1, 230-2, and 230-3 belong to the low-security perimeter.

A node is a physical computer machine that is executing a server. Servers are software applications that provide access to data and other computer resources remotely. An example of a server is a web server which provides access to web page content. As used in this application, the word "server" refers only to software that is executing on a physical computer machine (or node).

A telecommunication network is usually comprised of a plurality of servers which can have varying functions. Some servers can be more prone to become infected with computer viruses than others. For example, a large portion of all computer viruses spread via email, and, consequently, email servers are considered more likely to become a conduit through which computer viruses enter a telecommunications network.

Additionally, some servers are deemed more critical to the utility of a telecommunications network. For example, a server that manages a company's accounting system is much more critical than an email server. The loss of accounting records can be costly and have negative consequences for the company's well-being. Placing such mission-critical servers in different network security perimeters prevents computer viruses from entering the network through vulnerable servers, such as the email server, and spreading to the likes of the accounting server.

Secure network 110, is an example of a network which separates servers by placing them in different perimeters. As FIG. 2 depicts, nodes 210-1, 210-2, and 210-3 form part of a high-security perimeter. And nodes 230-1, 230-2, and 230-3 belong to a low-security perimeter. The two perimeters are separated by firewall 220.

Firewall 220 prevents viruses from propagating to the nodes in the high security perimeter. Just like firewall 120, firewall 220 is software and hardware that is designed to block unauthorized access while permitting authorized communications. It is a device configured to permit, deny, encrypt, and decrypt network traffic. However, unlike firewall 120, firewall 220 is configured to implement more stringent network policies than firewall 120. One such policy rule is "do not allow transfer of executable files." If a computer virus crosses firewall 120, the executable file that carries the virus will be blocked from propagating into the high-security perimeter by firewall 220.

When multiple servers are executed in a physical computer machine, the maintenance of security perimeters becomes complicated. A technique known as virtualization is commonly used to run multiple servers (a.k.a. virtual servers) on the same physical computer machine. When virtualization is used in a network, the boundaries between different security perimeters become blurred and a potential for introducing security vulnerabilities is created.

FIG. 3 depicts the salient components of a node that uses virtualization. The node (i.e. Node 300) comprises hardware 310, virtualization layer 320, system software 330, system software 340, accounting server 332, and email server 342.

Hardware 310 is the electronic components that comprise node 310 (e.g. processor, memory, network adapter, etc.).

Virtualization Layer 320 is the main device through which virtualization is achieved. Virtualization layer 320 is a software layer that facilitates the sharing of the resources of hardware 310 by multiple system software instances. In particular, system software 330 and 340 are two different operating system instances that are concurrently executed by node 300. System software 330 executes an accounting server, and system software 340 executes an email server. The running of each server inside a separate operating system allows node 300 to achieve a degree of separation between the servers. This separation furthers network security and makes using virtualization a better option than running two servers inside the same operating system.

Nevertheless, using server virtualization can introduce security vulnerabilities to a network. As previously noted, it is desirable to keep email servers and accounting servers in separate security perimeters. The reason for the separation is that email servers, in general, are more prone to become infected, while accounting servers, because of their importance, should be kept as secure as possible.

When virtualization is used, as FIG. 3 illustrates, two applications that belong in different security perimeters may wind up executing on the same physical computer machine. Thus, it is possible for a computer virus to enter node 300 through email server 342, spread into virtualization layer 420, and infect accounting server 332 from there. In contrast, in the example of FIG. 2, the nodes do not use virtualization and each server executes on a separate physical computer machine. For this reason, in FIG. 2, the accounting server is completely separated from the email server, and, therefore, a virus cannot infect the accounting server without crossing a security device, such as firewall 220, first.

The relevance of the vulnerabilities introduced by virtualization can be understood through the concept of server migration. Server migration is the act of transferring one server from one physical computer machine to another physical computer machine. When a server is migrated, one or more files associated with the server are copied, a new operating system instance is started, and one or more of the copied files are executed within the new operating system instance.

FIG. 4 depicts an example of server migration. FIG. 4 depicts node 410 and node 420. Node 410 executes concurrently three servers: inventory server 432, employee information server 442, and accounting server 452. Node 420, in contrast, executes only email server 462. Each server is executing inside a separate system software instance.

At time=$t_0$, node 410 is overwhelmed by having to run three severs, while node 420 is underutilized. For this reason, accounting server 452 is migrated to node 410.

At time=$t_1$, the migration of accounting server 452 is completed and nodes 410 and 420 are executing two servers each. The migration, in this example, involves three salient tasks:
  i. copy one or more files associated with accounting server 452 to node 420,
  ii. instantiate a new system software instance on node 420, and
  iii. launch one or more of the copied files inside the new system software instance.

As a result of the migration, network vulnerability is introduced to node 420. The vulnerability is rooted in the fact that at time $t_1$ accounting server 452 and email server 462 are executing on the same physical machine. The vulnerability is of the same type as the one described in the discussion with respect to FIG. 3. To prevent such vulnerabilities from being created, network administrators must analyze each physical computer machine, and the servers it is running, on a case-by-case basis. The network administrators must exercise special care not to place incompatible servers on the same physical machine.

The exercise of such care is complicated by the number of server migrations which can be performed in a network over the course of a day. Server migration is frequently performed by network administrators. Servers can be migrated when a physical computer machine becomes damaged or when the load on one or more physical computer machines needs to be balanced. In sizable networks, virtual server migration is a routine task that is performed often.

Every time a virtual server is migrated from one physical computer machine to another, the possibility exists that vulnerability will be created because of human error. Therefore, the need exists for a method for increasing the security of the migration of servers that reduces the possibility of human error. Moreover, the need exists for a disciplined approach towards server migration that avoids the case-by-case analysis spoken of above.

SUMMARY OF THE INVENTION

The present invention addresses this need by providing an architecture and method for assessing the security of server migration.

In one embodiment of the present invention, a permission for running a system software instance alongside another system software instance is issued on the basis of a first policy rule concerning the operation of a first software application and a second policy rule concerning the execution of a second software application.

In a second embodiment of the present invention, an association between two network policy rules for individual servers are specified ahead of time (e.g. rule A is incompatible with rule B, etc.). This association is later used to determine whether it is desirable to execute two servers concurrently on the same physical computer machine. For example, and without limitation, if the second embodiment of the present invention is applied to the migration scenario of FIG. 4, the invention will retrieve a network policy rule associated with the email server and a network policy rule associated with the accounting server. An example of a network policy rule associated with the accounting server is the "do not allow transfer of executable files" rule which is enforced by firewall 220. Similarly, an example of a network policy rule associated with the email server is the "do not allow telnet traffic" rule that is enforced by firewall 110. The rules can be retrieved from a database, the firewalls themselves, or other similar source. After the rules are retrieved, the second embodiment of the present invention will locate a third rule that specifies the association between the first two rules. Based on the third rule, the second embodiment of the present invention will render a decision as to whether the email server should be allowed to execute concurrently with the accounting server on the same physical computer machine.

In a third embodiment of the present invention, permission for the concurrent execution of a first and second software applications is issued on the basis of a characteristic of the first software application. A "characteristic" of a software application is an item of information concerning the application. Examples of characteristics are identifier, function, etc. More examples of characteristics are provided in the "Detailed Description" section of this disclosure.

In a fourth embodiment of the present invention, when permission is refused, the system software instance that is used as host computing environment of the migrated software is shut down. In other embodiments, either of the system software instance and the migrated software is denied access to computing resources (e.g. CPU time, network access, etc.) as a consequence of the refusal.

In a fifth embodiment of the present invention, a tentative permission is issued which is contingent upon the implementation of a security policy rule by the physical computer machine to which software is migrated. Upon receipt of the policy rule, the physical computer machine launches a security application, such as an anti-virus program or firewall, and configures the launched application to implement the received rule.

A significant advantage of all embodiments of the present invention is that they increase the security of virtual server migration and provide a systematic way for assessing whether the migration of a server to a particular physical computer machine can become a source of network vulnerability.

DETAILED DESCRIPTION

Figure 5:
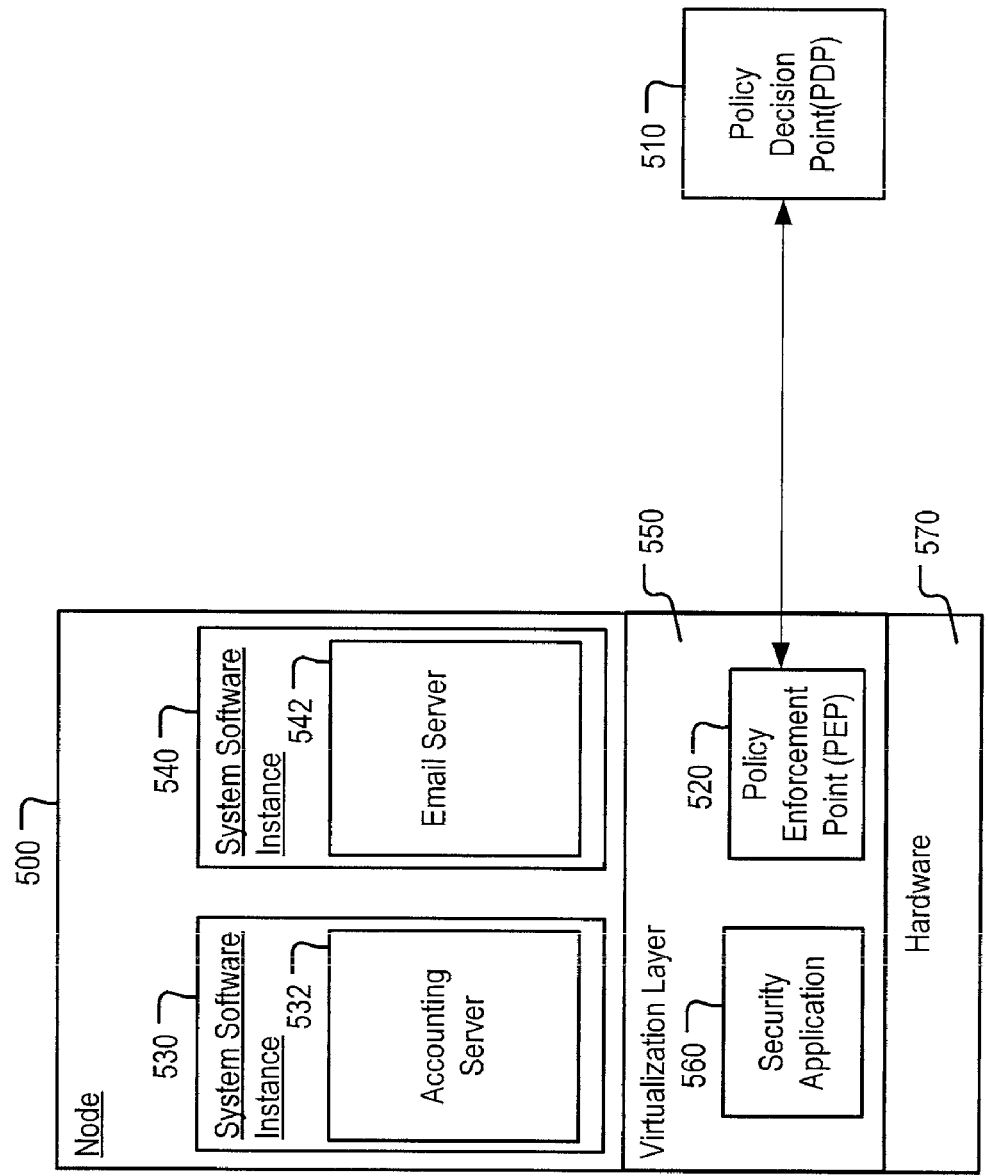
FIG. 5 depicts a schematic diagram of the salient components of the illustrative embodiment of the present invention.

FIG. 5 depicts a schematic diagram of the salient components of the illustrative embodiment of the present invention. The illustrative embodiment comprises node 500 and policy decision point (PDP) 510.

Node 500 is a physical computer machine that executes multiple software applications, wherein each individual application is contained within its own system software instance. In this way, it appears that each application is running on its own dedicated machine. Moreover, because each software application appears to be running on its own dedicated machine, one of the applications can be rebooted without affecting the others, and, also, a failure in one of the applications is less likely to affect the other applications. Node 500 comprises hardware 570, virtualization layer 550, security application 560, policy enforcement point (PEP) 520, system software 530, system software 540, software 532, and software 542.

Hardware 570 is the electronic components that comprise node 500, such as, for example, and without limitation, processor (single-core or multi-core), memory, transceiver, network interface, display, sound interface, permanent storage, video interface, etc. It will be clear to those skilled in the art how to make and use hardware 570.

Virtualization Layer 550 is a software layer that facilitates the sharing of the resources of hardware 570 by multiple system software images. In accordance with the illustrative embodiment of the present invention, virtualization layer 550 is an OKL4 microkernel, but it will be clear to those skilled in the art, after reading this disclosure, how to make and use alternative embodiments of the present invention in which virtualization layer 550 is any other Type 1 hypervisor (e.g. Xen™, VMware ESX Server™, etc.) or any other hosted virtual machine (e.g. QEMU™, VMware Workstation™, etc.).

System software 530 is an instance of the Linux operating system that is running on top of virtualization layer 550. It will be clear to those skilled in the art, after reading this disclosure, how to make and use alternative embodiments of the present invention in which system software 530 is any type of system software, firmware, or software platform that is capable of executing one or more software applications, such as, for example, and without limitation, Windows™, Android™, Solaris™, etc. It will be clear to those skilled in the art, after reading this disclosure, how to make and use alternative embodiments of the present invention in which the size and functionality of system software 530 varies. Those skilled in the art will readily recognize, after reading this disclosure, that alternative embodiments of the present invention can be devised in which system software 530 provides (or contains) only the minimum amount of system services that is necessary for the proper execution of software application 532.

System software 540 is an instance of the Linux operating system that is running on top of virtualization layer 550. System software 540 is executing concurrently with system software 530. It will be clear to those skilled in the art, after reading this disclosure, how to make and use alternative embodiments of the present invention in which System software 540 is any type of system software, firmware, or software platform that is capable of executing one or more software applications, such as, for example, and without limitation, Windows™, Android™, Solaris™, etc. Furthermore, it will be clear to those skilled in the art, after reading this disclosure, how to make and use alternative embodiments of the present invention in which the size and functionality of system software 540 varies. Those skilled in the art will readily recognize, after reading this disclosure, that alternative embodiments of the present invention can be devised in which system software 540 provides (or contains) only the minimum amount of system services that is necessary for the proper execution of software application 542.

Software 532 is an instance of an accounting server application that is running inside the address space of system software 530. The accounting server manages sensitive information, and, therefore, it needs to be protected by stringent telecommunications network policies. It will be clear to those skilled in the art, after reading this disclosure, how to make and use alternative embodiments of the present invention in which software 532 is any software application capable of executing on node 500, such as, for example, and without limitation, an FTP server, email server, authentication server, instant messaging server, instant messaging client, email client, etc.

Software 542 is an instance of an email server that is running inside the address space of system software 540. The email server is not very sensitive with respect to network security, and, therefore, it needs to be protected by less stringent telecommunications network security policies than software 532. Because software 542 is an email server, it is vulnerable to security breaches by computer viruses. It will be clear to those skilled in the art, after reading this disclosure, how to make and use alternative embodiments of the present invention in which software 542 is any software application capable of executing on node 500, such as, for example, and without limitation, an FTP server, email server, authentication server, instant messaging server, instant messaging client, email client, etc.

Security application 560 is a software firewall. Security application 560 is responsible for enforcing one more telecommunications network policies for incoming and outgoing traffic from node 500. In particular, security application 560 is capable of filtering the traffic to system software 540. It will be clear to those skilled in the art, after reading this disclosure, how to make and use alternative embodiments of the present invention in which security application 560 is any type of security application, such as, for example, and without limitation, an anti-virus program, adware blocker, popup blocker, etc.

Figure 4:
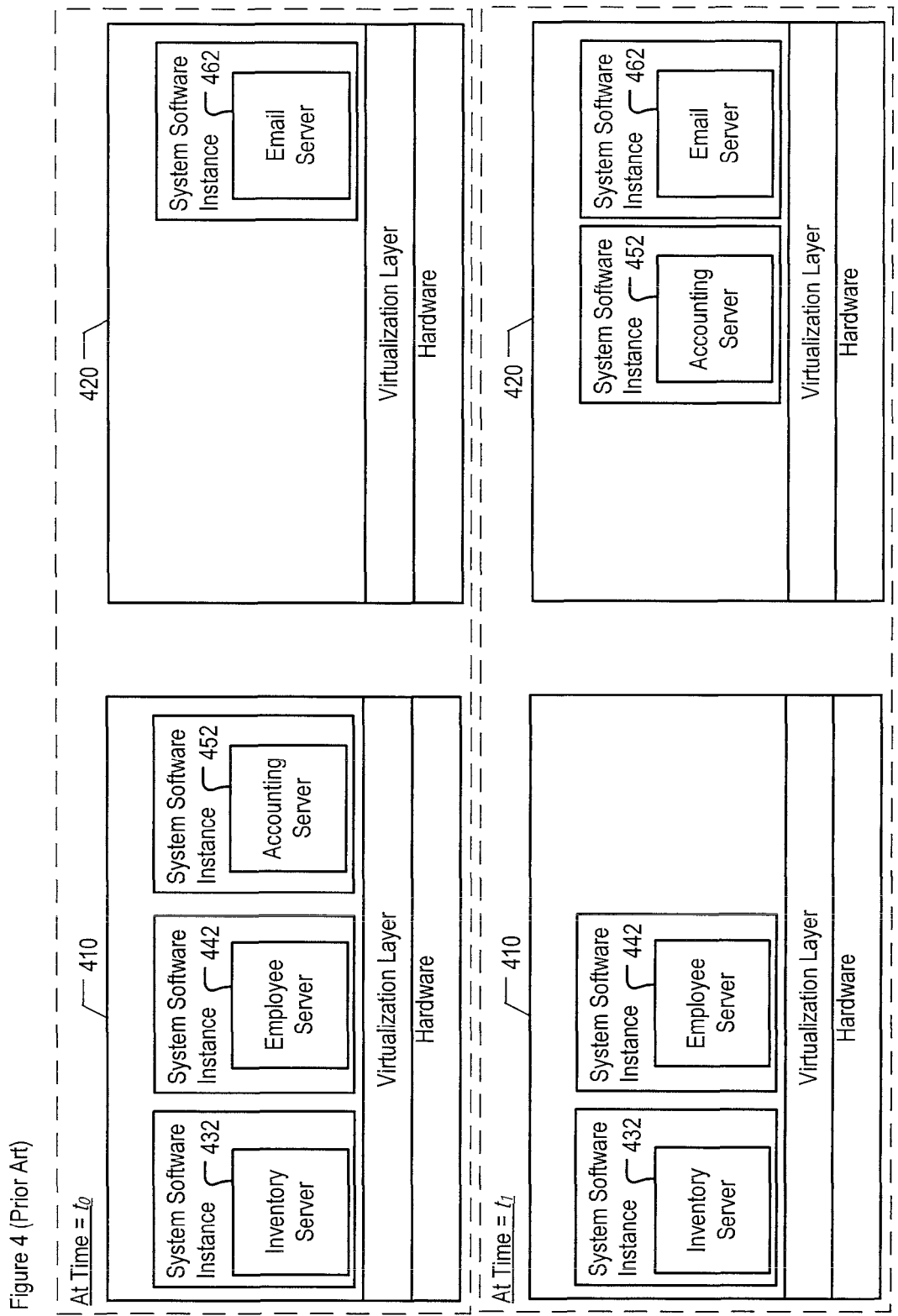
FIG. 4 depicts an example of server migration.

Policy enforcement point (PEP) 520 is a software module for enforcing one or more policy decisions that are rendered by policy decision point (PDP) 510. In accordance with the illustrative embodiment of the present invention, the policy enforcement point (PEP) is configured to block the operation of one or more virtual device drivers which are used by system software 540. In particular, the policy enforcement point (PEP) is capable of making one more system calls to virtualization layer 550 and instructing it to shut down one or more virtual device drivers. However, it will be clear to those skilled in the art, after reading this disclosure, how to make and use alternative embodiments of the present invention in which policy enforcement point (PEP) 520 is capable of enforcing the decisions of policy decision point (PDP) 510 in alternative ways, such as, for example, and without limitation, by shutting down system software 540 (which is accomplished by making system calls to virtualization layer 550), by blocking one or more networking ports used by system software 540 and the applications running inside it, etc. And still furthermore, it will be clear to those skilled in the art, after reading this disclosure, how to make and use alternative embodiments of the present invention in which policy enforcement point (PEP) 520 is capable of enforcing the decisions of policy decision point (PDP) 510 by instructing virtualization layer 520 to abort the loading and starting of system software 540. The operation of policy enforcement point (PEP) 520 is further described in the discussion with respect to FIG. 4.

Although, as depicted in FIG. 5, policy enforcement point (PEP) 520 appears to be part of virtualization layer 550, it will be clear to those skilled in the art, after reading this disclosure, how to make and use alternative embodiments of the present invention in which policy enforcement point (PEP) 520 is a separate application executing inside the memory space of virtualization layer 550. Also, those skilled in the art will readily recognize, after reading this disclosure, that alternative embodiments of the present invention can be devised in which policy decision point (PEP) 520 is executing on another physical computer machine and interacting with virtualization layer 550 through a remote connection (e.g. universal serial bus connection, telecommunications network connection, firewire connection, etc.).

Policy decision point (PDP) 510 is a software module where policy decisions concerning the operation of node 500 are made. In particular, policy decision point 510 is configured to decide whether software 542 should be allowed to execute on the same physical computer machine with software 532 (i.e. whether two virtual servers should be allowed to execute on the same physical computer machine). However, it will be clear to those skilled in the art, after reading this disclosure, how to make and use alternative embodiments of the present invention in which policy decision point (PDP) 510 is configured to make a decision about whether system software 540 should be allowed to execute concurrently with system software 530 on the same physical computer machine.

Figure 6:
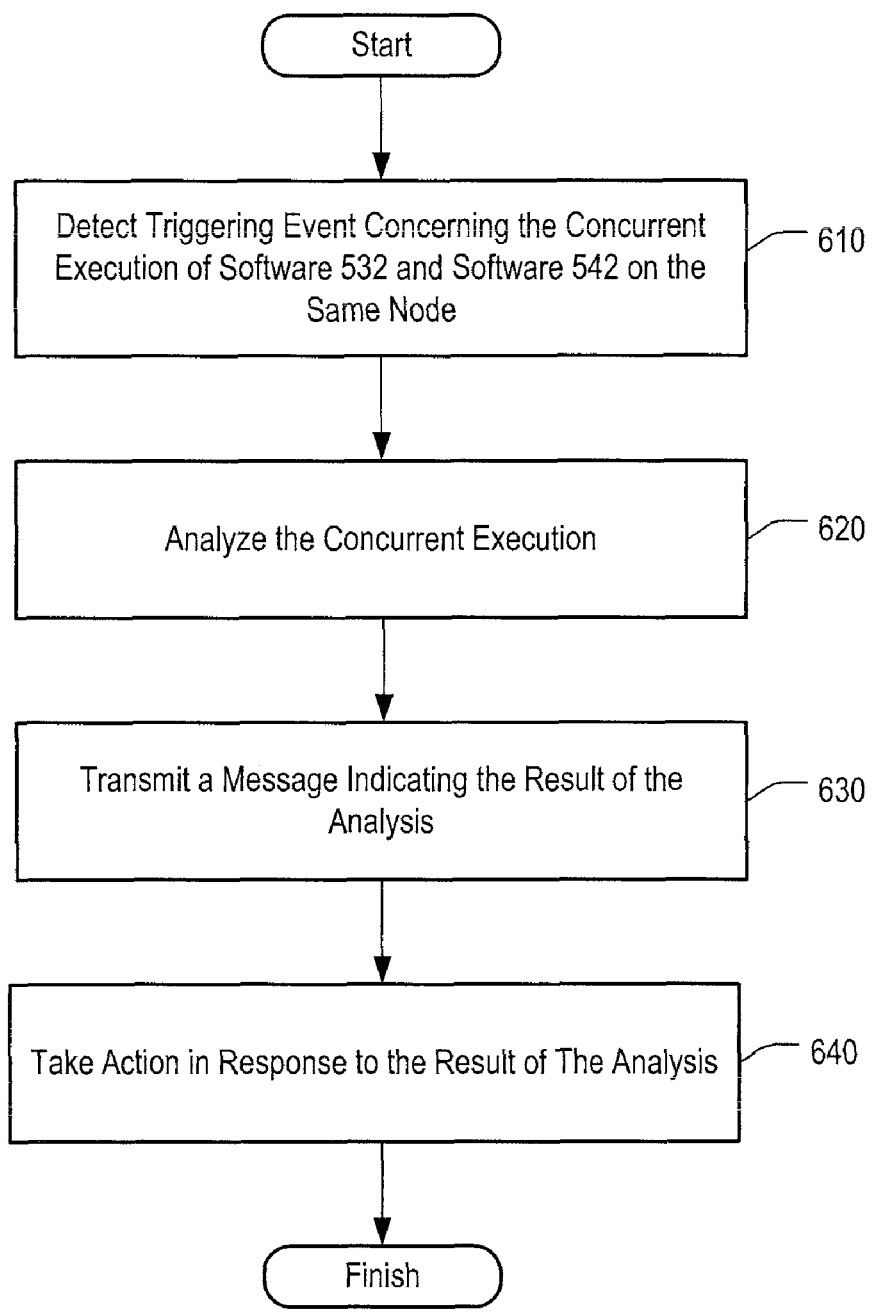
FIG. 6 depicts a flowchart of the execution of the salient tasks associated with the operation of the illustrative embodiment of the present invention.

FIG. 6 depicts a flowchart of the execution of the salient tasks associated with the operation of the illustrative embodiment of the present invention. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

At task 610, a triggering event concerning the concurrent execution of software 532 and software 542 is detected. Task 610 is further described in the discussion with respect to FIGS. 7A, 7B, and 7C.

At task 620, policy decision point (PDP) 510 analyzes the concurrent execution of software 532 and software 542. Task 610 is further described in the discussion with respect to FIG. 8.

At task 630, policy decision point (PDP) 510 transmits a message indicating the result of the analysis. Task 630 is further described in the discussion with respect to FIG. 9.

At task 640, policy enforcement point (PEP) 520 takes action in response to the result of the analysis. Task 640 is further described in the discussion with respect to FIG. 10.

Figure 7A:
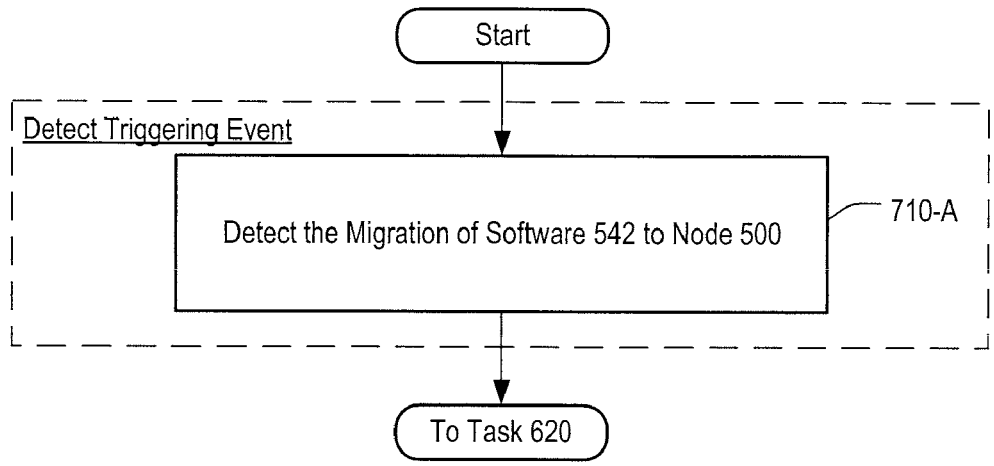
FIG. 7A depicts a flowchart of the execution of task 610 as performed by a first illustrative embodiment of the present invention.

FIG. 7A depicts a flowchart of the execution of task 610 as performed by a first illustrative embodiment of the present invention.

At task 710-A, policy enforcement point (PEP) 520 detects the migration of software 542 to node 500. In accordance with the illustrative embodiment of the present invention, policy enforcement point (PEP) 520 monitors the use of the permanent storage device of node 500 and detects whether a file (e.g. executable file, database file, library file, .dll file, .lib file, etc) associated with software 542 is copied to node 500's permanent storage. However, it will be clear to those skilled in the art, after reading this disclosure, how to make and use alternative embodiments of the present invention in which policy enforcement point 520 detects the migration of software 542 in a variety of ways, such as, for example, and without limitation, by receiving a message indicating the pendency of the migration and/or identifying the software to be migrated, by detecting the initiation of a file transfer connection between node 500 and another node, etc. Although, in accordance with the illustrative embodiment of the present invention, the migration is detected by policy enforcement point (PEP) 520, it will be clear to those skilled in the art, after reading this disclosure, how to make and use alternative embodiments of the present invention in which the migration is detected by another software module.

Figure 7B:
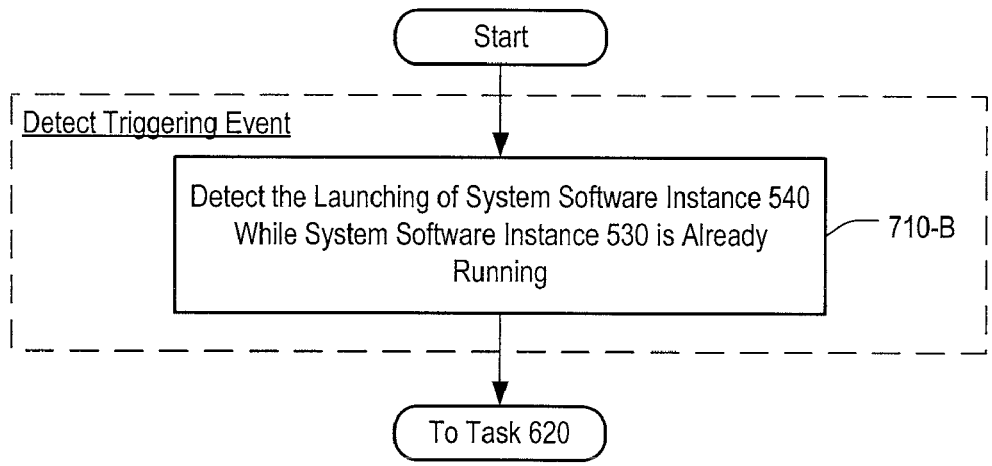
FIG. 7B depicts a flowchart of the execution of task 610 as performed by a second illustrative embodiment of the present invention.

FIG. 7B depicts a flowchart of the execution of task 610 as performed by a second illustrative embodiment of the present invention.

At task 710-B, policy enforcement point (PEP) 520 detects the launching of system software 540 by virtualization layer 550. Although, in accordance with the illustrative embodiment of the present invention, the launching is detected by policy enforcement point (PEP) 520, it will be clear to those skilled in the art, after reading this disclosure, how to make and use alternative embodiments of the present invention in which the launching of system software 540 is detected by another software module. It will be clear to those skilled in the art how to detect instantiation of a system software instance by virtualization layer 550.

Figure 7C:
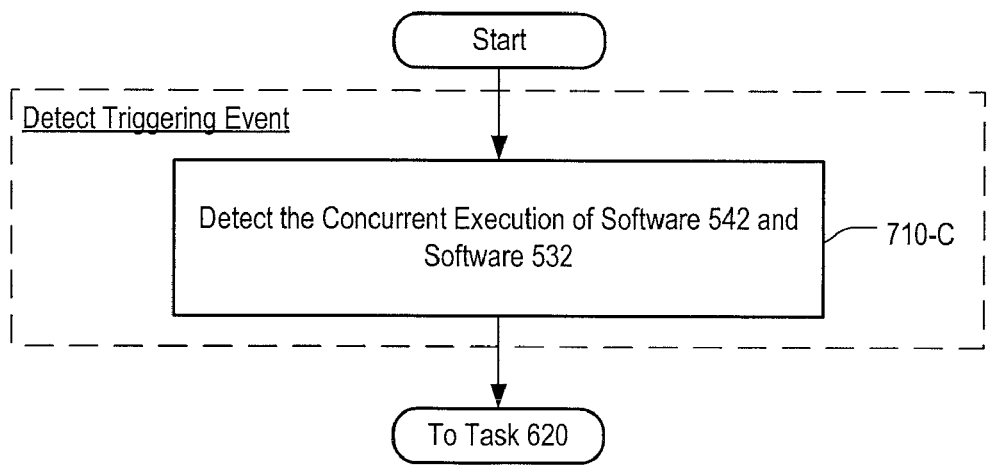
FIG. 7C depicts a flowchart of the execution of task 610 as performed by a third illustrative embodiment of the present invention.

FIG. 7C depicts a flowchart of the execution of task 610 as performed by a third illustrative embodiment of the present invention.

At task 710-C policy enforcement point (PEP) 520 detects the concurrent execution of software 532 and 542 on node 500. In accordance with the illustrative embodiment of the present invention, policy enforcement point (PEP) 520 monitors the network traffic in and out of node 500 and detects one or more application fingerprints that are present in one or more packets (e.g. low level TCP/IP datagrams or high level packets, such as HTTP packets) that comprise the outgoing traffic. The fingerprinting is used to identify the source application of the packets. When policy enforcement point (PEP) 520 detects that the packets come from multiple sources, that serves as a signal that multiple software applications (e.g. virtual servers, etc.) are executing on node 500.

In accordance with the illustrative embodiment of the present invention, the measured fingerprint constitutes one or more of the number of bits in packet headers, the specific values of one or more bits in a packet header, the type of encryption used by one or more of the applications, etc. However, it will be clear to those skilled in the art, after reading this disclosure, how to make and use alternative embodiments of the present invention in which the fingerprinting is based on any item of data found in one or more packets transmitted by node 500. Furthermore, it will be clear to those skilled in the art, after reading this disclosure, how to make and alternative embodiments of the present invention in which policy enforcement point (PEP) 520 reads the content of the payload of packets transmitted by software 532 and 542 for information that identifies the packets' source (e.g. navigator objects transmitted by web browsers).

Furthermore, it will be clear to those skilled in the art, after reading this disclosure, how to make and use alternative embodiments of the present invention in which the execution of software 542 is detected by monitoring the use of a protocol signaling stack located inside virtualization layer 550 and recognizing that the stack is being called by multiple software applications. And still furthermore, it will be clear to those skilled in the art, after reading this disclosure, how to make and use alternative embodiments of the present invention in which the execution of software 542 is detected by monitoring the utilization of the hardware resources of node 500 (e.g. CPU time, memory usage, etc.) and noticing an increase.

Although, in accordance with the illustrative embodiment of the present invention, the migration is detected by policy enforcement point (PEP) 520, it will be clear to those skilled in the art, after reading this disclosure, how to make and use alternative embodiments of the present invention in which the migration is detected by another software module.

Figure 8:
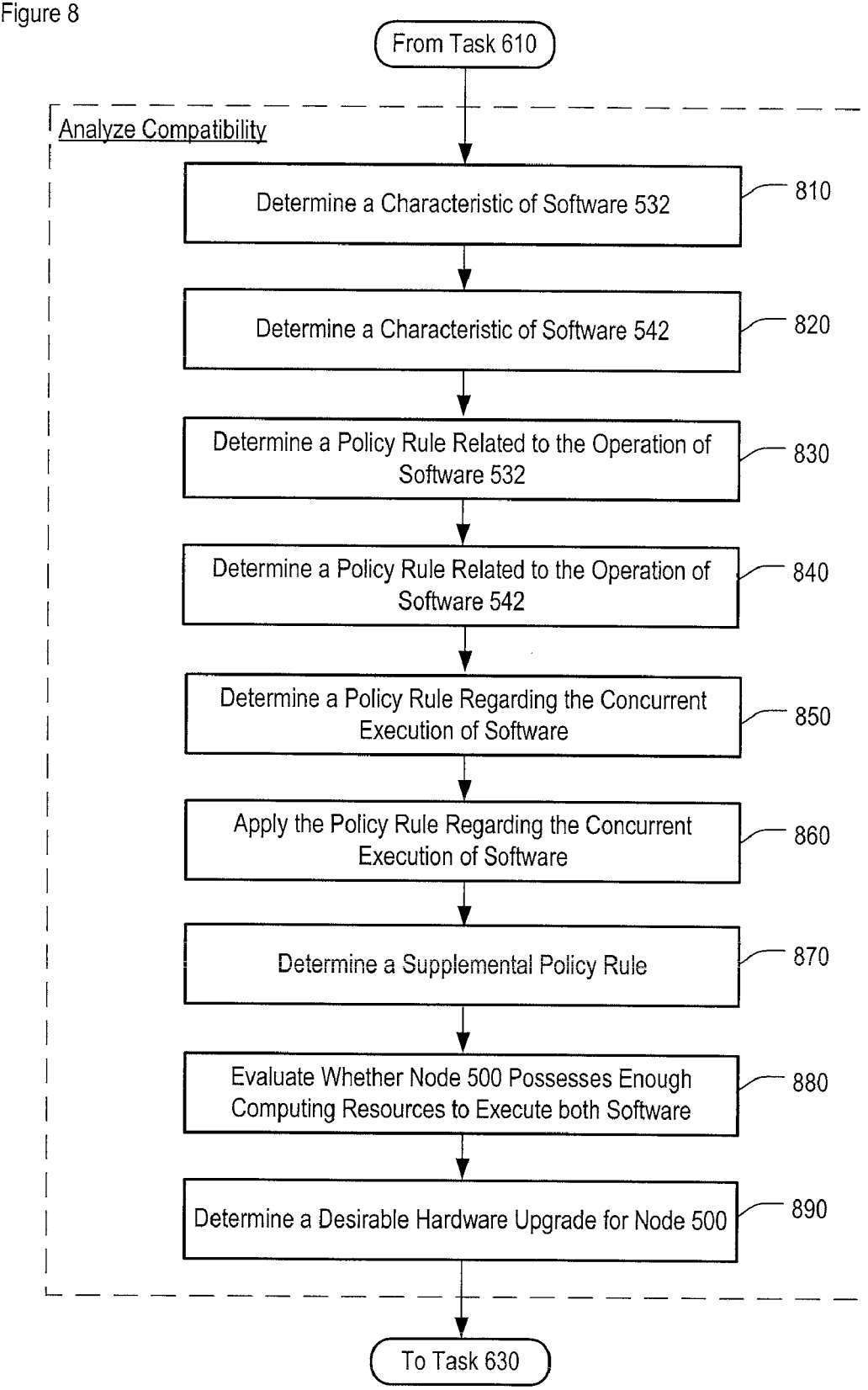
FIG. 8 depicts a flowchart of the execution of the salient subtasks associated with the performance of task 620.

FIG. 8 depicts a flowchart of the execution of the salient subtasks associated with the performance of task 620. It will be clear to those skilled in the art, after reading this disclosure, how to perform the tasks associated with FIG. 8 in a different order than represented or to perform one or more of the tasks concurrently. Furthermore, it will be clear to those skilled in the art, after reading this disclosure, how to make and use alternative embodiments of the present invention that omit one or more of the tasks.

At task 810, policy decision point (PDP) 510 determines a characteristic of software 532. In accordance with the illustrative embodiment of the present invention, policy decision point (PDP) 510 determines an identifier for the software (e.g. a numerical or string identifier serving to distinguish software 532 from other software applications and/or application instances) which policy decision point (PDP) 510 can use to retrieve a policy rule related to the operation of software 532. In accordance with the illustrative embodiment of the present invention, an indication of the characteristic is transmitted to policy decision point (PDP) 510 by a software module executing on virtualization layer 550 (such as policy enforcement point (PEP) 520), but it will be clear to those skilled in the art, after reading this disclosure, how to make and use alternative embodiments of the present invention in which the identifier is contained in a message received by policy decision point (PDP) 510 from any possible source (e.g. network administrator's computer that transmitted a query to the policy decision point).

It will be clear to those skilled in the art, after reading this disclosure, how to make and use alternative embodiments of the present invention in which policy decision point (PDP) 510 determines alternative characteristics, such as for example, and without limitation, the function performed by software 532 (e.g. accounting server, file transfer client, Internet chat client, telephony application, anti-virus program, word processor, FTP server, email server, authentication server, etc.), sensitivity of information managed by software 532, telecommunications protocols used by software 532 (e.g. hypertext transfer protocol (HTTP), file transfer protocol (FTP), session initiation protocol (SIP), etc.), number of simultaneous telecommunications network connections established by software 532, and so forth.

More specifically, in one alternative embodiment of the present invention, policy decision point (PDP) 510 determines the sensitivity of software 532 with respect to network security. Some software applications manage highly sensitive information, such as bank account numbers, employee social security numbers, etc. This type of software is deemed to require high network security (e.g. multiple firewalls, authorized access only, other stringent network policy rules, etc.). In contrast, other software applications, such as Internet chat clients, manage not so sensitive information, and, consequently, they are subject to more relaxed network policy rules. In accordance with the illustrative embodiment of the present invention, policy decision point (PDP) 510 retrieves information about the security sensitivity of software 532 from a database. However, it will be clear to those skilled in the art, after reading this disclosure, how to make and use alternative embodiments of the present invention in which policy decision point (PDP) 510 derives the sensitivity of software 532 with respect to network security from one or more telecommunications network policy rules associated with the software.

At task 820, policy decision point (PDP) 510 determines a characteristic of software 542. In accordance with the illustrative embodiment of the present invention, policy decision point (PDP) 510 determines an identifier for the software (e.g. a numerical or string identifier serving to distinguish software 532 from other software applications and/or application instances) which policy decision point (PDP) 510 can use to retrieve a policy rule related to the operation of software 542. In accordance with the illustrative embodiment of the present invention, an indication of the characteristic is transmitted to policy decision point (PDP) 510 by a software module executing on virtualization layer 550 (such as policy enforcement point (PEP) 520), but it will be clear to those skilled in the art, after reading this disclosure, how to make and use alternative embodiments of the present invention in which the identifier is contained in a message received by policy decision point (PDP) 510 from any possible source (e.g. network administrator's computer that transmitted a query to the policy decision point).

It will be clear to those skilled in the art, after reading this disclosure, how to make and use alternative embodiments of the present invention in which policy decision point (PDP) 510 determines alternative characteristics, such as, for example, and without limitation, the function performed by software 542 (e.g. email server, file transfer client, Internet chat client, telephony application, anti-virus program, word processor, FTP server, email server, authentication server, etc.), the sensitivity of information managed by software 542, telecommunications protocols used by software 542 (e.g. hypertext transfer protocol (HTTP), file transfer protocol (FTP), session initiation protocol (SIP), etc.), number of simultaneous telecommunications network connections established by software 542, etc.

At task 830, policy decision point (PDP) 510 determines a telecommunications network policy rule related to the operation of software 532. In accordance with the illustrative embodiment of the present invention, policy decision point (PDP) 510 receives the rule over a telecommunications network connection from a database that contains one or more network policy rules, but it will be clear to those skilled in the art, after reading this disclosure, how to make and use alternative embodiments of the present invention in which the network policy rule is stored in a record residing on the physical computer machine that executes policy decision point (PDP) 510.

At task 840, policy decision point (PDP) 510 determines a telecommunications network policy rule related to the operation of software 542. In accordance with the illustrative embodiment of the present invention, policy decision point (PDP) 510 receives the rule over a telecommunications network connection from a database that contains one or more network policy rules, but it will be clear to those skilled in the art, after reading this disclosure, how to make and use alternative embodiments of the present invention in which the network policy rule related to the operation of software 542 is stored in a record residing on the physical computer machine that executes policy decision point (PDP) 510.

At task 850, one or more rules for the concurrent execution of software on node 500 are specified. The rules for the concurrent execution of software on the same node take the form of an association between two or more network policy rules and a label that describes whether the two network policy rules are compatible. In accordance with the illustrative embodiment of the present invention, the rules for the concurrent execution of software on the same node are specified manually by a network administrator. However, it will be clear to those skilled in the art, after reading this disclosure, how to make and use alternative embodiments of the present invention in which the rules for the concurrent execution of software on the same node are generated automatically.

In accordance with the illustrative embodiment of the present invention, the rules for the concurrent execution of software have the format described in Table 1:

TABLE 1

Rules for the Concurrent Execution of Software on Node 500

| Policy Rule Combination | Compatibility |
|---|---|
| {Policy Rule A}, {Policy Rule B} | Incompatible |
| {Policy Rule C}, {Policy Rule D} | Compatible |
| {Policy Rule A}, {Policy Rule B}, {Policy Rule C} | Compatible |

The first rule, for the concurrent execution of software, in Table 1 specifies an association between policy rule A and policy rule B and contains the label Incompatible. In particular, the first rule specifies that a permission for the concurrent execution on the same node of a first software which is associated with policy rule A, and second software which is associated with policy rule B should be refused. In accordance with the illustrative embodiment of the present invention, in order for software to be associated with a policy rule, the rule has to be related to the operation of the software. In the example from the "Background" section of this disclosure, the accounting server is subject to the policy rule "do not allow transfer of executable files" which is enforced by firewall 200. This policy rule is an example of a policy rule related to the operation of a software application. It should also be noted that those skilled in the art will recognize, after reading this disclosure, how to make and use alternative embodiments of the present invention in which the association between software and a network policy rule is determined on account of the rule and the software being related in a database record, or on account of manual input entered by a network administrator.

Furthermore, in accordance with the illustrative embodiment of the present invention, additional rules, for the concurrent execution of software on the same node, are specified that are based on one or more characteristics of software applications. In accordance with the illustrative embodiment of the present invention the rules for the concurrent execution of software on the same node are specified manually by a network administrator. However, it will be clear to those skilled in the art, after reading this disclosure, how to make and use alternative embodiments of the present invention in which the rules are generated automatically. In accordance with the illustrative embodiment of the present invention, the rules for the concurrent execution of software on the same node have the format described in Table 2.

TABLE 2

Rules for the Concurrent Execution of Software on Node 500

| Characteristic Combination | Compatibility |
|---|---|
| {Characteristic A}, {Characteristic B} | Incompatible |
| {Characteristic C}, {Characteristic D} | Compatible |
| {Characteristic A}, {Characteristic B}, {Characteristic C} | Compatible |

The first rule in Table 2 specifies an association between software characteristic A and software characteristic B and contains the label Incompatible. This rule specifies that a permission for the concurrent execution on the same node of a first software which possesses characteristic A, and second software which possesses characteristic B should be refused by policy decision point (PDP) 510.

It will be clear to those skilled in the art, after reading this disclosure, how to make and use alternative embodiments of the present invention that use a variety of rules regarding the concurrent execution of software 532 and software 542, such as for example, and without limitation, rules that depend on the functions performed by software 532 and 542, rules that depend on the sensitivity with respect to network security of software 532 and 542, rules that depend on the telecommunications network protocols used by software 532 and 542, rules that depend on any characteristic of software 532 and/or 542, a rule specifying the maximum number of system software instances that are allowed to run on node 500, etc.

An example of a rule that considers the functions performed by software 532 and 532 is "do not execute instant messaging servers concurrently with inventory management servers." Instant messaging servers can be very likely to become the conduit for computer viruses (or other malware). Therefore, some network administrator may find it desirable to block those applications from running on the same computer hardware with software that is sensitive with respect to network security.

Figure 1:
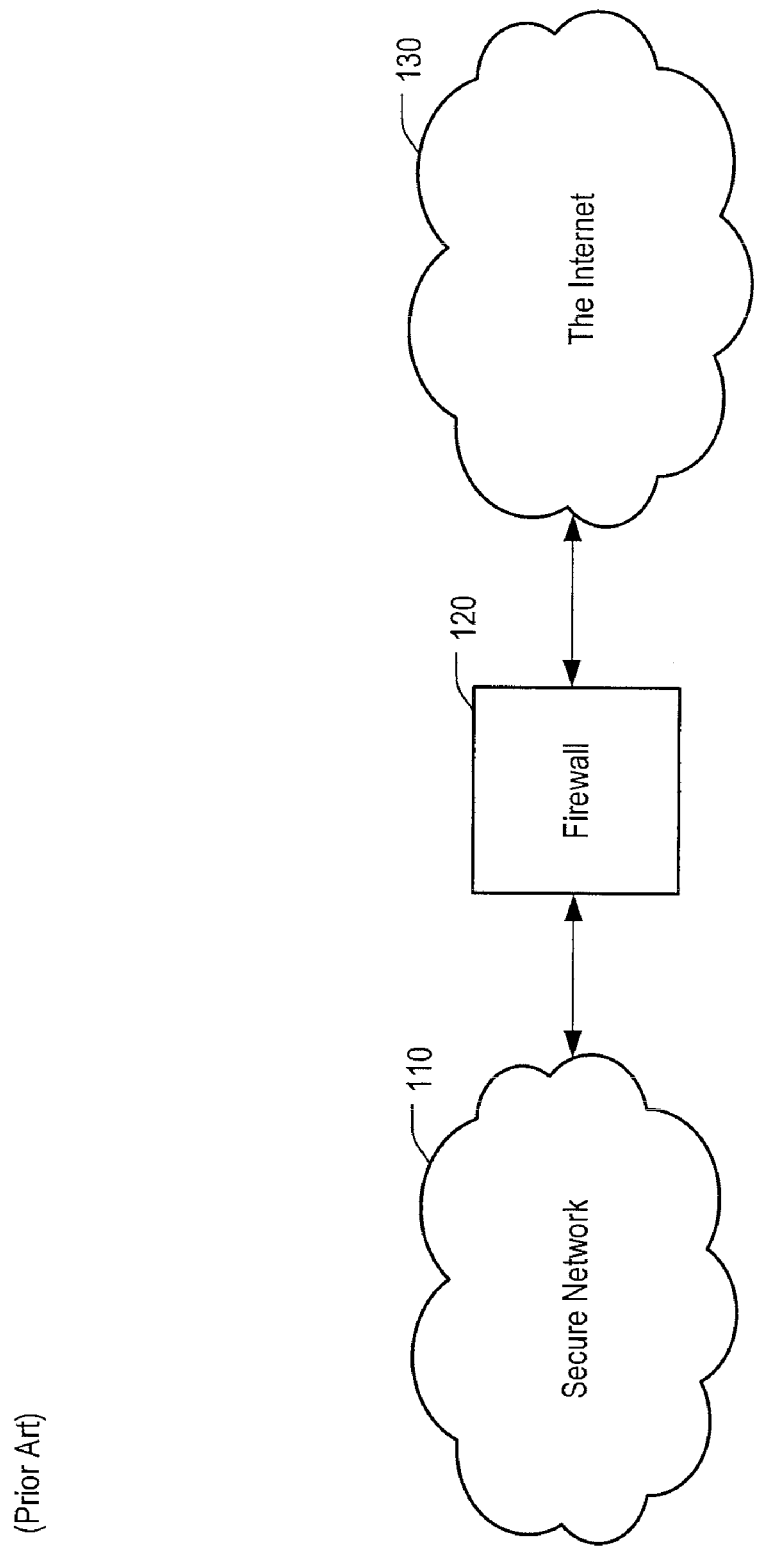
FIG. 1 depicts an example of a telecommunications system as is known in the prior art.
Figure 2:
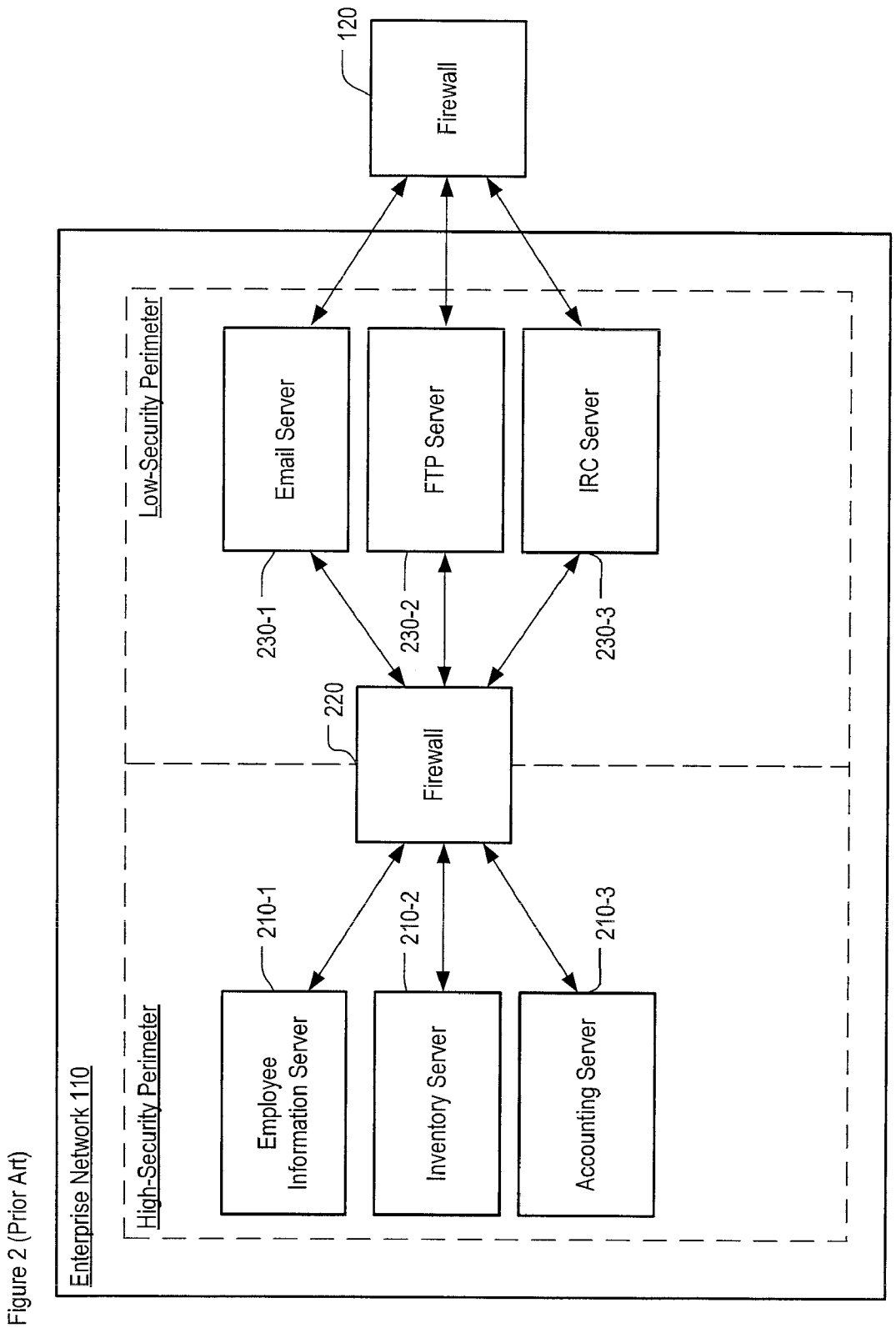
FIG. 2 depicts the internal organization of secure network 110.
Figure 3:
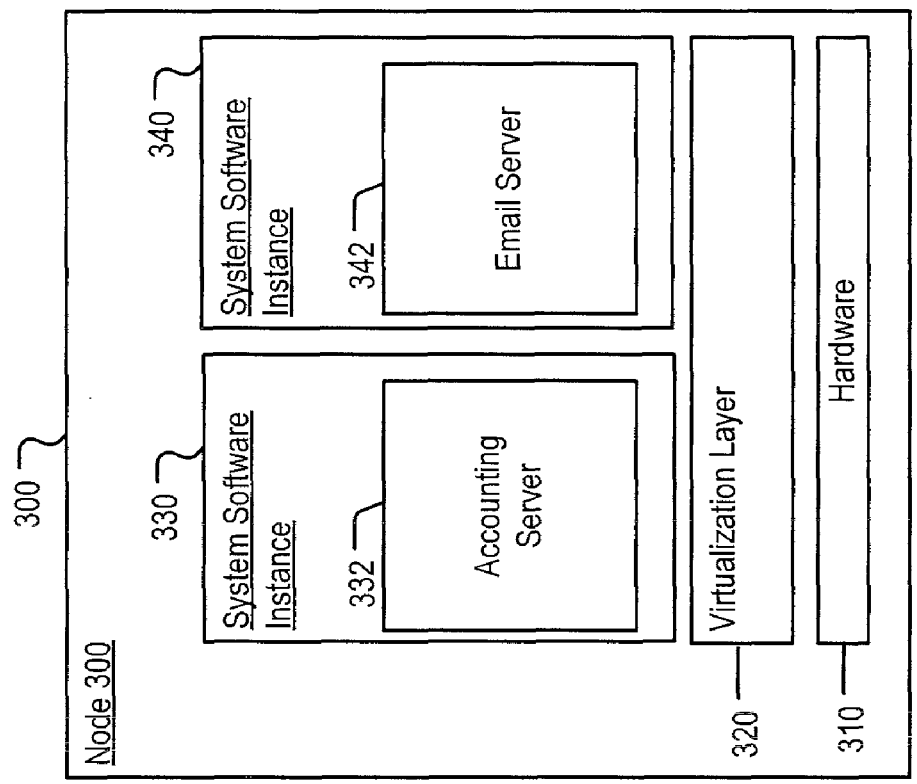
FIG. 3 depicts the salient components of a node that uses virtualization.

An example of rule that considers the sensitivity of software 532 and software 542 is "do not run software with high security sensitivity on the same computer hardware as software with low security sensitivity." Under this rule, for example, email servers cannot be executed concurrently on the same physical computer machine with software that belongs to an employee management system. This rule allows the enforcement of high-security and low-security perimeters, such as those depicted in FIG. 2.

An example of a rule that considers the telecommunications protocols used by software 532 and 542 is "do not run applications that use the file transfer protocol (FTP) together with applications that use file transfer protocol secure (FTPS). The rationale for this rule is that the use of the file transfer protocol (FTP) application may negate the extended security benefits of file transfer protocol secure (FTPS) and provide a conduit into node 500 for viruses or other malware.

At task 860, policy decision point (PDP) 510 locates a rule for the concurrent execution of software on node 500 that applies to the situation at hand. In particular, policy decision point (PDP) 510 locates a rule for the concurrent execution of software that covers the combination of the policy rule associated with software 532 and the policy rule associated with software 542, which were determined at tasks 830 and 840. After the rule for the concurrent execution of software is located, policy decision point determines whether the combination of policy rules is deemed compatible or incompatible by consulting the label associated with the rule for the concurrent execution of software. If the combination is compatible, policy decision point (PDP) allows the concurrent execution of software 532 and 542 on node 500. Otherwise, permission for the concurrent execution is denied.

Additionally, in accordance with the illustrative embodiment of the present invention, policy decision point (PDP) 510 locates a rule that covers the combination of the characteristics determined at tasks 810 and 820. After the rule is located, policy decision point determines whether the combination of policy rules is deemed compatible or incompatible by consulting the label associated with the rule. If the combination is compatible, policy decision point (PDP) allows the concurrent execution of software 532 and 542 on node 500. Otherwise, permission for the concurrent execution is denied.

In accordance with the illustrative embodiment of the present invention, an information record with the rules concerning the concurrent execution of software is kept on the physical computer machine that executes policy decision point (PDP) 510. However, it will be clear to those skilled in the art, after reading this disclosure, how to make and use alternative embodiments of the present invention in which the rules are obtained by policy decision point (PDP) 510 over a telecommunications network connection.

At task 870, policy decision point (PDP) 510 determines a supplemental telecommunications network policy rule which, when implemented at node 500, will render software 532 and 542 compatible to execute on the same physical computer machine. More specifically, policy decision point (PDP) searches the rules specified at task 550 for one or more rules in which the combination of policy rules is a superset of the rules determined at tasks 530 and 540 and which comprises the Compatible label. In accordance with the illustrative embodiment of the present invention, the supplemental policy rule(s) is the complement of the set of rules determined at tasks 830 and 840 with respect to the set of rules specified by the combination part of the rule concerning the concurrent execution of software on node 500.

For example, as Table 1 illustrates, the combination of {Policy Rule A} and {Policy Rule B} is deemed incompatible. Whereas, the combination of {Policy Rule A}, {Policy Rule B} and {Policy Rule C} is deemed compatible. When a situation arises in which software 532 is associated with policy rule A and software 542 is associated with policy rule B, policy decision point will locate the third rule in Table 1 (i.e. {Policy Rule A}, {Policy Rule B} and {Policy Rule C} deemed compatible), and will determine that policy rule C is a supplemental policy rule which when implemented will render software 532 and 542 compatible to execute on the same physical computer machine.

At task 880, policy decision point (PDP) 510 determines whether node 500 possesses sufficient computing resources to execute both software 532 and software 542. In accordance with the illustrative embodiment of the present invention, policy decision point (PDP) 510 determines the utilization of one or more of the hardware resources of node 500 (e.g. CPU utilization, bandwidth utilization, memory utilization, etc.) and determines whether node 500 has sufficient computer hardware resources to execute both software 532 and software 542. In order to make this determination, policy decision point (PDP) 510 obtains an estimate of the resource consumption of software 532 and 542. In accordance with the illustrative embodiment of the present invention, the estimate is received at policy decision point (PDP) 510 from a remote server, but it will be clear to those skilled in the art, after reading this disclosure, how to make and use alternative embodiments of the present invention in which a record of the resource consumption estimate is kept on the physical computer machine on which the policy decision point is executing. When the cumulative of the consumption of computer hardware resources by software 532 and the estimated consumption of hardware resources by software 542 exceeds the computer hardware resources of node 500, policy decision point (PDP) 510 determines that the concurrent execution of software 532 and 542 on node 500 is undesirable.

At task 890, policy decision point (PDP) determines a hardware upgrade for node 500 which would allow it to execute both software 532 and 542. In accordance with the illustrative embodiment of the present invention, when, at task 870, policy decision point (PDP) 510 determines that node 500 is short on memory, the policy decision point issues a recommendation to upgrade the amount of memory available to node 500 and prescribes a memory amount by which node 500 needs to be upgraded in order to execute software 532 and 542 concurrently. However, it will be clear to those skilled in the art, after reading this disclosure, how to make and use alternative embodiments of the present invention in which policy decision point (PDP) 510 prescribes a different upgrade, such as, for example, and without limitation, processor upgrade, increase of the network bandwidth that is available to node 500, etc.

Figure 9:
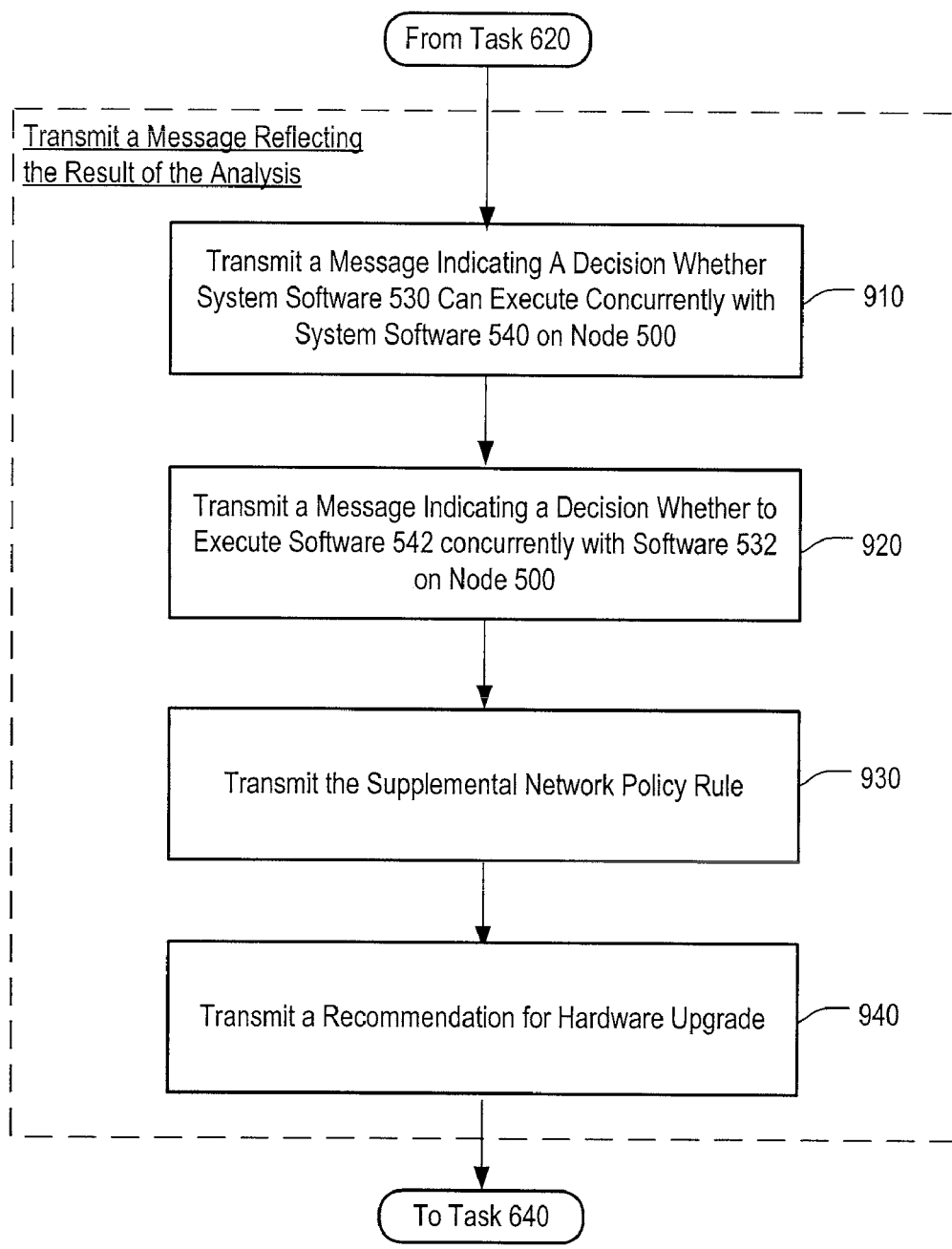
FIG. 9 depicts a flowchart of the execution of the salient subtasks associated with the performance of task 630.

FIG. 9 depicts a flowchart of the execution of the salient subtasks associated with the performance of task 630. It will be clear to those skilled in the art, after reading this disclosure, how to perform the tasks associated with FIG. 9 in a different order than represented or to perform one or more of the tasks concurrently. Furthermore, it will be clear to those skilled in the art, after reading this disclosure, how to make and use alternative embodiments of the present invention that omit one or more of the tasks.

At task 910, policy decision point (PDP) 510, in a well known fashion, transmits a message indicating whether software 532 can execute concurrently with software 542. The message indicates the result of the application of the rule(s) for concurrent execution of software at task 860. It will be clear to those skilled in the art, after reading this disclosure, how to make and use alternative embodiments of the present invention in which the message is based on the application of a rule that pertains directly to system software instances, such as the rule that limits the maximum number of system software instances, which was mentioned above.

At task 920, policy decision point (PDP) 510, in a well known fashion, transmits a message indicating whether software 532 can execute concurrently with software 542. The message indicates the result of the execution of task 860.

At task 930, policy decision point 510, in a well known fashion, transmits the supplemental policy rule.

At task 940, policy decision point (PDP) 510, in a well known fashion, transmits a message indicating the recommended hardware upgrade which is determined at task 890.

Figure 10:
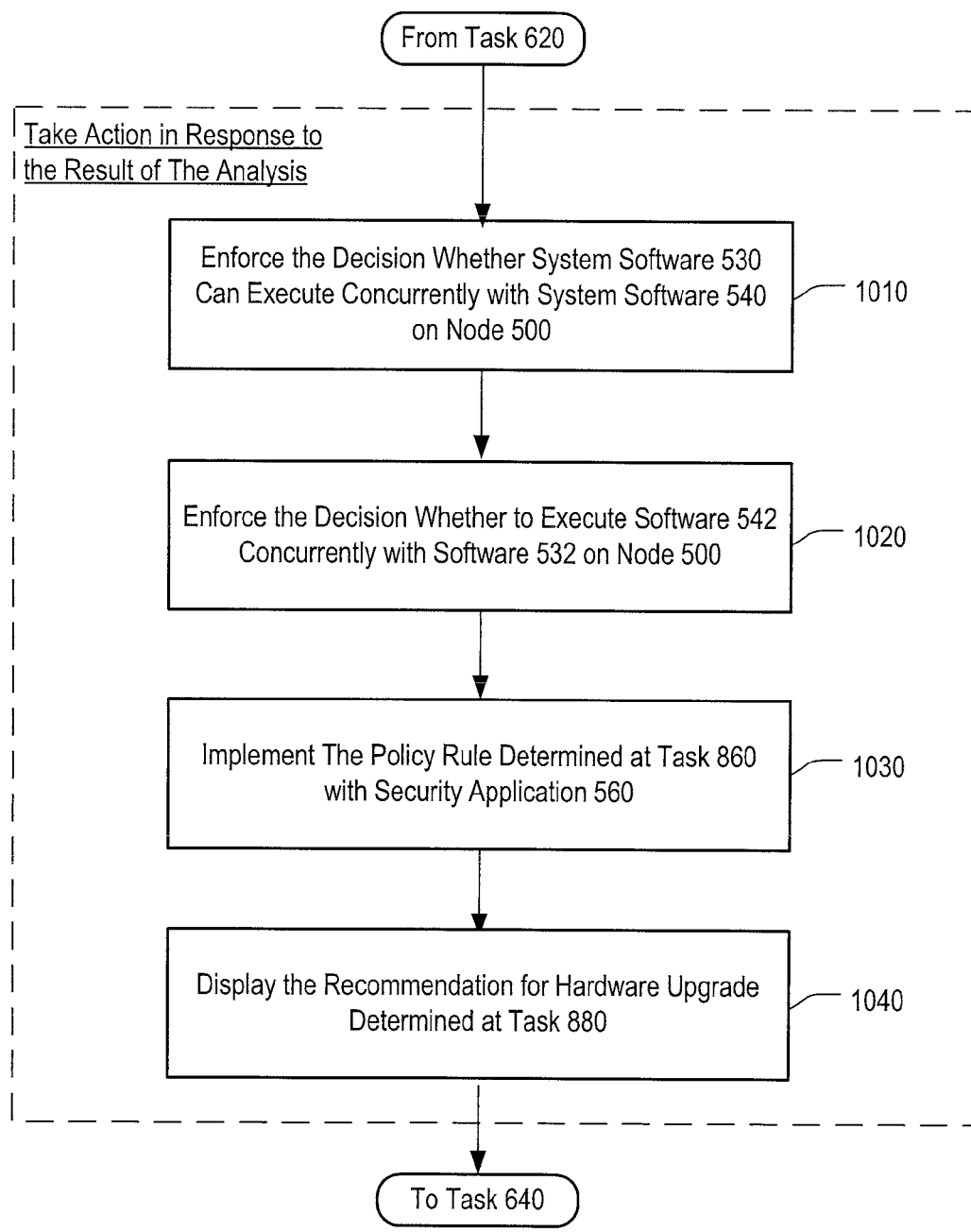
FIG. 10 depicts a flowchart of the execution of the salient subtasks associated with the performance of task 640.

FIG. 10 depicts a flowchart of the execution of the salient subtasks associated with the performance of task 640. It will be clear to those skilled in the art, after reading this disclosure, how to perform the tasks associated with FIG. 10 in a different order than represented or to perform one or more of the tasks concurrently. Furthermore, it will be clear to those skilled in the art, after reading this disclosure, how to make and use alternative embodiments of the present invention that omit one or more of the tasks.

At task 1010, policy enforcement point (PEP) 520 receives the message transmitted at task 910 and enforces the decision whether system software 530 can execute concurrently with system software 540. In accordance with illustrative embodiment of the present invention, policy enforcement point (PEP) 520 enforces the decision by making one more system calls to virtualization layer 550 and instructing it to block one or more virtual device drivers which are used by system software 540. However, it will be clear to those skilled in the art, after reading this disclosure, how to make and use alternative embodiments of the present invention in which policy enforcement point (PEP) 520 is capable of enforcing the decisions of policy decision point (PDP) 510 in alternative ways, such as, for example, and without limitation, shutting down system software 540, by blocking one or more networking ports used by system software 540 and the applications running inside it, etc.

At task 1020, policy enforcement point (PEP) 520 receives the message transmitted at task 920 and enforces the decision whether software 532 can execute concurrently with software 542. In accordance with illustrative embodiment of the present invention, policy enforcement point (PEP) 520 enforces the decision by denying computing resources to software 542. In accordance with the illustrative embodiment of the present invention, policy enforcement point (PEP) 520 blocks the operation of one or more virtual device drivers used by system software 540. However, it will be clear to those skilled in the art, after reading this disclosure, how to make and use alternative embodiments of the present invention in which the denial of computing resources is accomplished in a different way, such as, for example, and without limitation, by blocking one or more networking ports used by software 542, by shutting down one or more signaling protocol stacks that are located in virtualization layer 550, etc.

At task 1030, policy enforcement point (PEP) 520, in a well known fashion, causes security application 560 to implement the supplemental policy rule determined at task 860 and launches the security application.

At task 1040, policy enforcement point (PEP) 520 receives the message transmitted at task 1040 and displays the recommendation on the display screen of node 500. However, it will be clear to those skilled in the art, after reading this disclosure, how to make and use alternative embodiments of the present invention in which the message is relayed to a computer used by a network administrator who is responsible for hardware upgrades.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A non-transitory computer readable medium storing instructions, that when executed by a computer, cause the computer to:
   execute a first system software instance in a virtualized environment;
   execute a policy enforcement point (PEP); and
   receive from a policy decision point (PDP) a decision as to whether a second system software instance should be allowed to execute concurrently with the first system software instance in the virtualize environment, wherein the policy enforcement point (PEP) is configured to selectively prevent the execution of the second system software instance in the virtualized environment based on the decision of the policy decision point (PDP).

2. The non-transitory computer readable medium of claim 1 wherein the decision depends on a telecommunications network policy rule related to the operation of software executing inside the first system software instance.

3. The non-transitory computer readable medium of claim 1 wherein the decision depends on a characteristic of software executing inside the first system software instance.

4. The non-transitory computer readable medium of claim 1 wherein the decision depends on an amount of computing resources available.

5. A system, comprising:
   a first telecommunications network node comprising a first server software and a processor, wherein the first server software is associated with a first telecommunications network perimeter, wherein the processor of the first node is operable to execute a first system software instance and a policy enforcement point (PEP);
   a second telecommunications network node comprising a second server software and a processor, wherein the second server software is associated with a second telecommunications network perimeter, wherein the processor of the second telecommunications network node is operable to execute a policy decision point (PDP);
   wherein the policy decision point (PDP) is configured to decide when a second system software instance should be allowed to execute concurrently with the first system software instance on the first telecommunications network node in a virtualized environment, wherein the decision depends on a first network policy rule related to the first telecommunications network perimeter and a second network policy rule related to the security of the second telecommunications network perimeter; and
   wherein the policy enforcement point (PEP) is configured to selectively prevent the execution of the second system software instance in the virtualized environment based on the decision of the policy decision point (PDP).

6. A method, comprising:
   transmitting a message by a software module indicating a permission to execute on a node a first server concurrently with a second server in a virtualized environment, wherein:
     the first server is executing within a first system software instance, and the second server is within a second system software instance;
     the permission depends on a first telecommunications network policy rule and a second telecommunications network policy rule, wherein:
       the first telecommunications network policy rule relates to the operation of the first server, and
       the second telecommunications network policy rule relates to the operation of the second server.

7. The method of claim 6 wherein the permission depends on hardware resources of the node.

8. The method of claim 6 comprising:
   evaluating the hardware resources of the node; and
   transmitting a message indicating a hardware upgrade for the node.

9. The method of claim 6 wherein the message indicating permission is transmitted in response to a detection of an instantiation of the second system software instance on the node.

10. The method of claim 6 wherein the message indicating permission is transmitted in response to a detection of a request for system services by the second system software instance.

11. The method of claim 6 wherein the message indicating permission depends on a telecommunications network policy rule concerning the concurrent execution of multiple system software instances on the node in the virtualized environment.

12. A method, comprising:
transmitting from a first node, a message indicating a permission to execute on a second node a first software concurrently with a second server, wherein:
the first software is executed within a first system software instance, and the second software is executed within a second system server instance;
the permission is based on a first telecommunications network policy rule and a second telecommunications network policy rule, wherein:
the first telecommunications network policy rule relates to the operation of the first server, and
the second telecommunications network policy rule relates to the operation of the second server;
transmitting from the first node to the second node a message identifying a telecommunications network policy rule to be implemented by firewall software executed on the second node; and
in response to receipt of the message, launching at the second node, an instance of firewall software implementing the rule.

13. A method comprising:
receiving a first telecommunications network policy rule, wherein the first rule relates to the operation of a first server in a telecommunications network;
receiving a second telecommunications network policy rule, wherein the second rule relates to the operation of second server in the telecommunications network;
transmitting a message containing a permission to migrate the second server to a virtualized environment of a first telecommunications network node, wherein:
a first telecommunications network node is host to the first server,
the first server is executing within a first system software instance,
the migration of the second server to the first telecommunications network node comprises
the instantiation of a second system software instance at the first telecommunications network node and executing the second server within the second system software instance; and
the permission depends on the first telecommunications network policy rule and second telecommunications network policy rule.

14. A method, comprising:
receiving a first telecommunications network policy rule, wherein the first telecommunications network policy rule relates to the operation of a first server in a telecommunications network;
receiving a second telecommunications network policy rule, wherein the second telecommunications network policy rule relates to the operation of second server in the telecommunications network;
transmitting a message containing a permission to migrate the second server a virtualized environment of a first telecommunications network node, wherein:
the first telecommunications network node is host to the first server,
the first server is executing within a first system software instance,
the migration of the second server to the first telecommunications network node comprises the instantiation of a second system software instance at the first node and executing the second server within the second system software instance; and
the permission depends on the first telecommunications network policy rule and second telecommunications network policy rule; and
transmitting a message indicating a suggestion for a hardware upgrade of the first node, wherein the suggestion depends on the expected utilization of computer hardware resources by the first virtual server.

15. A method, comprising:
receiving a first telecommunications network policy rule, wherein the first telecommunications network policy rule relates to the operation of a first server in a telecommunications network;
receiving a second telecommunications network policy rule, wherein the second telecommunications network policy rule relates to the operation of second server in the telecommunications network;
transmitting a message containing a permission to migrate the second server a virtualized environment of a first telecommunications network node, wherein:
the first node is host to the first server,
the first server is executing within a first system software instance,
the migration of the second server to the first node comprises the instantiation of a second system software instance at the first node and executing the second server within the second system software instance; and
the permission depends on the first policy rule and second policy rule;
transmitting an indication of a third telecommunications network policy rule, wherein:
the third telecommunications network policy rule is to be implemented by a firewall software, wherein the firewall software is executing on the first node, and
the third telecommunications network policy rule depends on the first rule and second rule.

16. The method of claim 15 comprising:
transmitting a message indicating a suggestion for a hardware upgrade of the telecommunications network node, wherein the suggestion depends on the expected utilization of computer hardware resources by the first virtual server.

17. The method of claim 15 comprising transmitting an indication of a third telecommunications network policy rule, wherein:
the third telecommunications network policy rule is to be implemented by a firewall software, wherein the firewall software is executing on the telecommunications network node,
the third telecommunications network rule depends on the first telecommunications network rule and second telecommunications network rule.

18. A method comprising:
receiving a request to migrate a second virtual server to a virtualized environment of a telecommunications network node, wherein the first telecommunications network node is executing a first virtual server; and
transmitting a message containing a permission to migrate the second virtual server to the telecommunications network node, wherein:

the first virtual server is executing within a first system software instance, and the migration of the second virtual server to the telecommunications network node comprises the instantiation of a second system software instance at the telecommunications network node and executing the second virtual server within the second system software instance; and the permission depends on a first telecommunications network policy rule and a second telecommunications network policy rule.

19. A system comprising:

a first telecommunications network node executing a virtualized environment, wherein the first node is operable to execute a first virtual server and a first software module, wherein the first virtual server is executing within a first system software instance;

a second software module, wherein the second software module decides whether a second virtual server should be allowed to execute within a second system software instance concurrently with the first virtual server on the first node; and wherein the first software module selectively prevents the operation of the second virtual server on the basis of a decision provided by the second software module.

20. The system of claim 19 further comprising a second telecommunications network node, wherein the second telecommunications network node is operable to execute the second software module.

* * * * *